USOO9691385B2

United States Patent
Neubacher et al.

(10) Patent No.: US 9,691,385 B2
(45) Date of Patent: Jun. 27, 2017

(54) METHODS AND APPARATUS FOR ASSOCIATING DICTATION WITH AN ELECTRONIC RECORD

(71) Applicant: Nuance Communications, Inc., Burlington, MA (US)

(72) Inventors: Andreas Neubacher, Vienna (AT); Mehmet Mert Oez, Baden (AT); Matthias Helletzgruber, Vienna (AT); Gernot Langer, Katzelsdorf (AT)

(73) Assignee: Nuance Communications, Inc., Burlington, MA (US)

( * ) Notice: Subject to any disclaimer, the term of this patent is extended or adjusted under 35 U.S.C. 154(b) by 381 days.

(21) Appl. No.: 14/309,207

(22) Filed: Jun. 19, 2014

(65) Prior Publication Data

US 2015/0371637 A1 Dec. 24, 2015

(51) Int. Cl.
*G10L 15/00* (2013.01)
*G10L 25/00* (2013.01)
*G06F 17/27* (2006.01)
*G06F 17/21* (2006.01)
*G10L 15/26* (2006.01)
*G06F 17/30* (2006.01)
(Continued)

(52) U.S. Cl.
CPC ........ *G10L 15/26* (2013.01); *G06F 17/30882* (2013.01); *G10L 25/48* (2013.01); *G11B 27/34* (2013.01); *H04M 11/10* (2013.01); *G10L 15/30* (2013.01)

(58) Field of Classification Search
USPC ................. 704/1–9, 235, 246, 275
See application file for complete search history.

(56) References Cited

U.S. PATENT DOCUMENTS 7,286,997 B2* 10/2007 Spector ............... G06F 19/322
  705/2
8,275,613 B2*  9/2012 Harter .............. G06F 17/30746
  434/362
(Continued)

FOREIGN PATENT DOCUMENTS

EP  2 288 130 A1  2/2011

OTHER PUBLICATIONS

International Search Report and Written Opinion for International Application No. PCT/US2015/033653 mailed Aug. 18, 2015.

*Primary Examiner* — Edgar Guerra-Erazo
(74) *Attorney, Agent, or Firm* — Wolf, Greenfield & Sacks, P.C.

(57) ABSTRACT

According to some aspects, a method of associating dictation with an electronic record in a system having a dictation system comprising a dictation application for capture of speech input and a separate electronic records system for managing electronic records is provided. The method comprises receiving, by the dictation application, speech input from a user corresponding to a dictation to be associated with an electronic record of the electronic records system, obtaining, by the dictation application, a job identifier associated with the dictation, providing, by the dictation application, the job identifier and audio data based on the speech input for transcription, obtaining, by the dictation application, a dictation marker comprising the job identifier and one or more delimiters, and causing the dictation marker to be inserted into the electronic record.

20 Claims, 12 Drawing Sheets

(51) Int. Cl.
   *H04M 11/10*  (2006.01)
   *G11B 27/34*  (2006.01)
   *G10L 25/48*  (2013.01)
   *G10L 15/30*  (2013.01)

(56) References Cited

U.S. PATENT DOCUMENTS

| | | | |
|---|---|---|---|
| 8,886,521 B2 * | 11/2014 | Patch | G10L 15/26 704/9 |
| 9,305,052 B2 * | 4/2016 | Zalis | G06Q 10/10 |
| 2004/0024616 A1 * | 2/2004 | Spector | G06F 19/322 705/2 |
| 2005/0171762 A1 | 8/2005 | Ryan et al. | |
| 2008/0086305 A1 | 4/2008 | Lewis et al. | |
| 2008/0091694 A1 * | 4/2008 | Harter | G06F 17/30746 |
| 2009/0216558 A1 * | 8/2009 | Reisman | G06F 19/328 705/3 |
| 2010/0088117 A1 * | 4/2010 | Belden | G06F 19/321 705/3 |
| 2010/0157097 A1 | 6/2010 | Lee et al. | |
| 2011/0301943 A1 * | 12/2011 | Patch | G10L 15/26 704/9 |
| 2013/0110547 A1 * | 5/2013 | Englund | G06F 19/322 705/3 |
| 2013/0198225 A1 * | 8/2013 | Zalis | G06Q 10/10 707/769 |
| 2014/0324457 A1 * | 10/2014 | Kim | G06Q 50/24 705/3 |

* cited by examiner

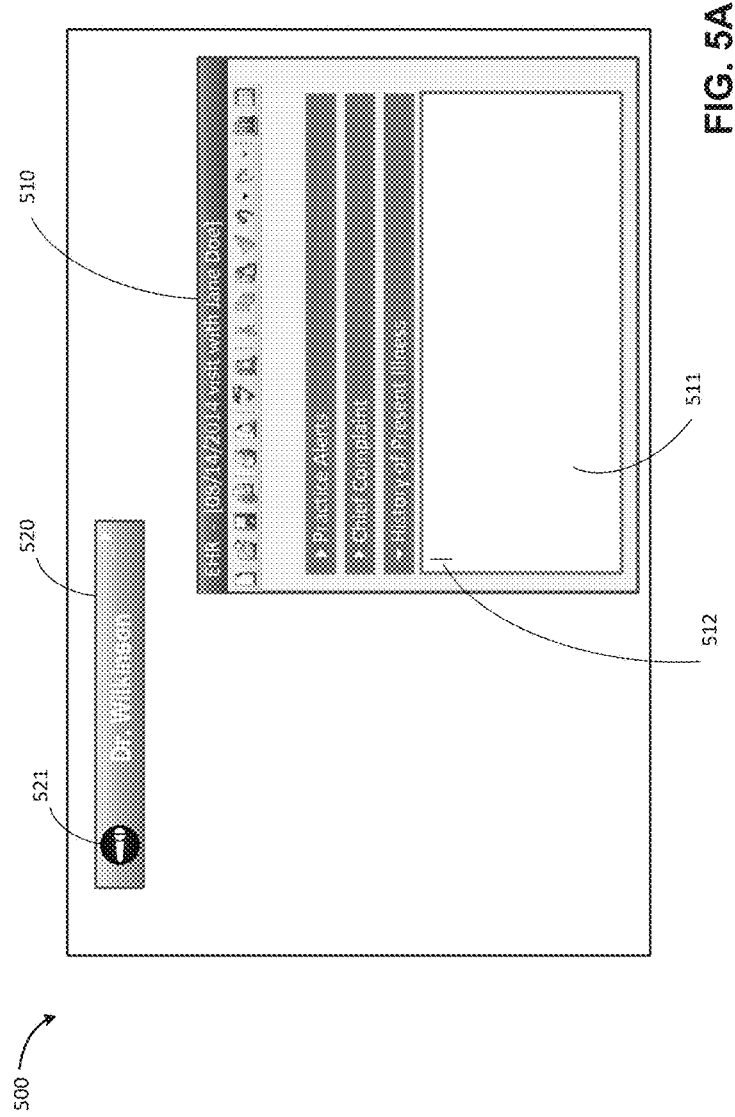

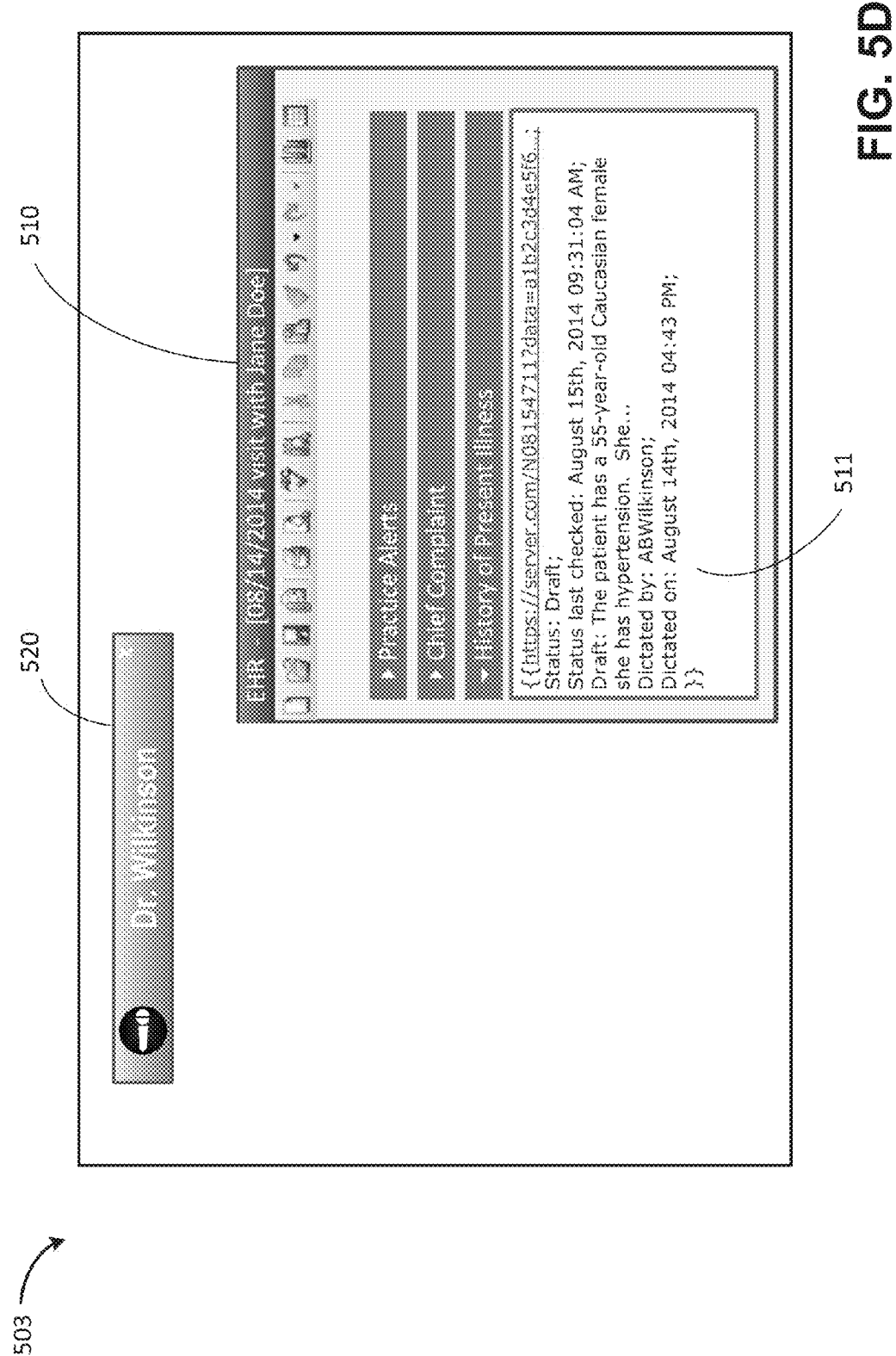

METHODS AND APPARATUS FOR ASSOCIATING DICTATION WITH AN ELECTRONIC RECORD

BACKGROUND

Dictation systems that capture speech input from a user for subsequent transcription are widely used to facilitate data entry in a variety of industries, including the health care, legal and media industries. For example, in the field of health care, doctors and other medical professionals often dictate notes regarding patients, such as in response to a patient encounter such as a patient visit, a medical procedure performed on the patient, a diagnostic analysis of patient data, etc. As another example, an attorney may dictate a memorandum or a brief (or a portion thereof) to be added to the appropriate electronic record for the associated legal matter. Independent of the field of endeavor, the dictation, once captured, is then typically transcribed (e.g., by a human transcriptionist, using automatic speech recognition, or a combination of both) and entered into or otherwise associated with the corresponding electronic record.

To satisfactorily accomplish this workflow, the correct electronic record must be identified so that corresponding transcriptions are placed in the proper location within the electronic record system. One method by which this may be achieved is by requiring the user (e.g., the dictator) to manually enter identifying information to make the necessary association between a dictation and a corresponding electronic record. For example, in the health care context, the doctor may be required to manually enter patient information, such as name, date of birth, etc. when recording the dictation by typing the information into the correct system, by dictating enough identifying information into the dictation itself, scanning a barcode on a physical file, etc.

The provided information is then extracted downstream (e.g., by a transcriptionist and/or by an ASR system) and used to associate the transcription with the electronic health record. However, this solution has the drawback of placing the burden on the physician, both in requiring the doctor to spend time providing the information and by requiring that the doctor have the appropriate information on hand. Additionally, relatively significant work may be required downstream to associate the transcription with the corresponding electronic record based on the provided information and this process is susceptible to error.

An alternative solution is to integrate the dictation system with the electronic records system so that the integrated system can automatically make the necessary associations. However, the variety of new and legacy dictation systems and electronic records systems makes doing so a difficult and potentially cost-prohibitive solution. For example, a health care facility may not want to invest the time and money in the development effort, training and/or maintenance involved in procuring and implementing an integrated solution to the above described workflow. In some circumstances, it may not even be possible to integrate a given dictation system with a given electronic records systems.

SUMMARY

Some embodiments include a method of associating dictation with an electronic record in a system having a dictation system comprising a dictation application for capture of speech input and a separate electronic records system for managing electronic records, the method comprising receiving, by the dictation application, speech input from a user corresponding to dictation to be associated with an electronic record of the electronic records system, obtaining, by the dictation application, a dictation marker comprising a job identifier associated with the dictation and one or more delimiters, and causing the dictation marker to be inserted into the electronic record.

Some embodiments include a system for capturing dictation for an electronic records system and associating the dictation with an electronic record managed by the electronic records system, comprising an input configured to receive speech input from a user corresponding to the dictation to be associated with the electronic record, and at least one processor configured to obtain a dictation marker comprising a job identifier associated with the dictation and one or more delimiters, and cause the dictation marker to be inserted into the electronic record.

Some embodiment include at least one computer readable storage medium storing instructions that, when executed by at least one processor, perform a method of associating dictation with an electronic record in a system having a dictation system comprising a dictation application for capture of speech input and a separate electronic records system for managing electronic records, the method comprising receiving, by the dictation application, speech input from a user corresponding to a dictation to be associated with an electronic record of the electronic records system, obtaining, by the dictation application, a dictation marker comprising a job identifier associated with the dictation and one or more delimiters, and causing the dictation marker to be inserted into the electronic record.

BRIEF DESCRIPTION OF DRAWINGS

The accompanying drawings are not intended to be drawn to scale. In the drawings, for purposes of clarity, not every component may be labeled in every drawing. In the Drawings:

FIGS. 5A-5F illustrate a series of user interface snapshots of an exemplary user device performing techniques for integration-free delivery of transcribed dictated speech, according to some embodiments;

DETAILED DESCRIPTION

Figure 1:
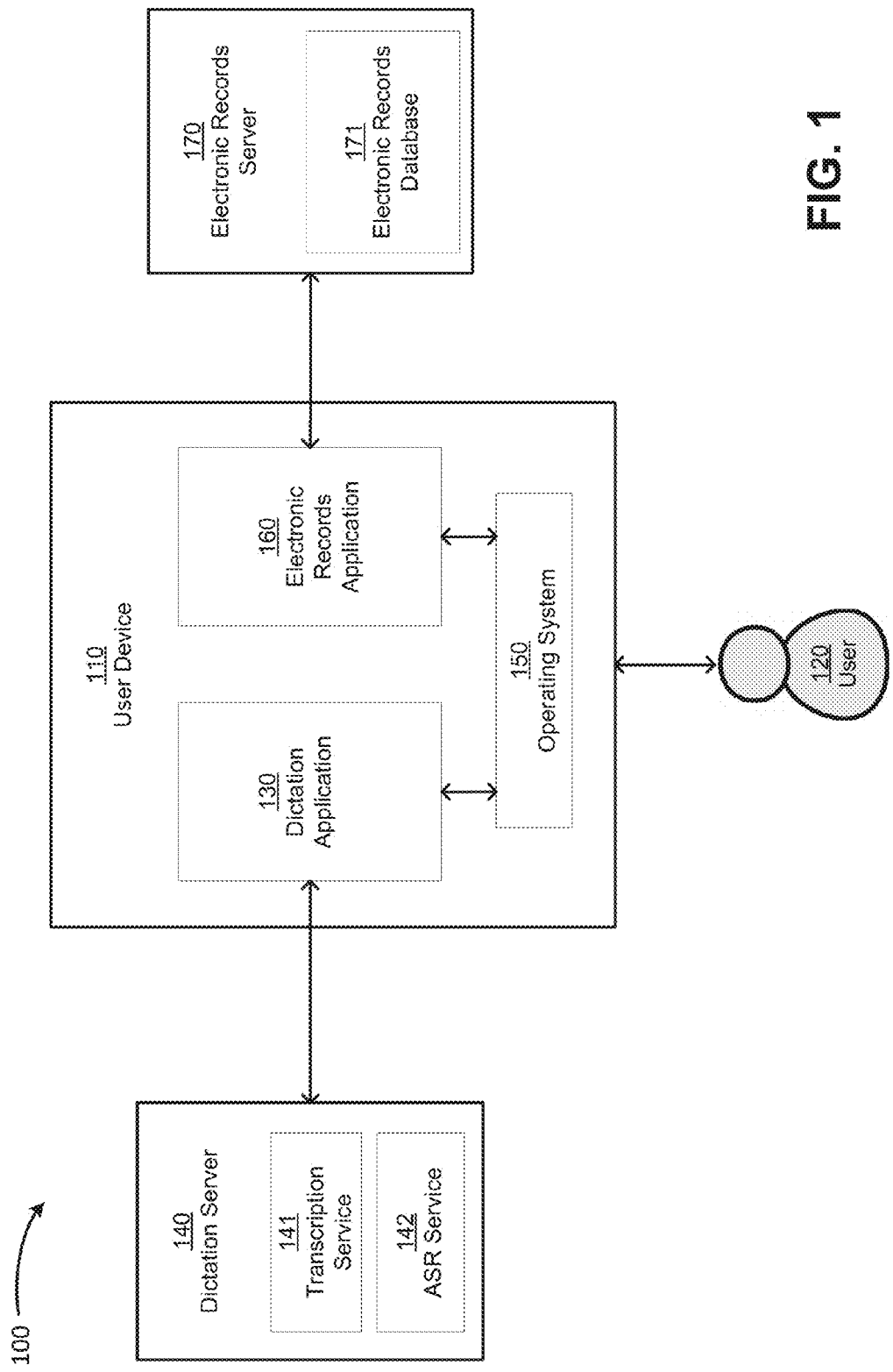
FIG. 1 depicts a schematic view of an exemplary system wherein dictation is utilized as a mode of providing data to an electronic records system, according to some embodiments.

As discussed above, existing dictation systems require either that a user manually enter identifying information when providing dictation (e.g., a doctor may be required to provide identifying patient information that can be later matched to an electronic record), and/or require that the dictation system be integrated with a relevant electronic records system. Thus, either the user is burdened with providing the information needed to associate the dictation with the proper electronic record so that this information can be utilized downstream, usually with not insignificant effort and possibility of error, or a relatively significant time and money investment in system integration needs to be made to ensure that the integrated system is capable of correctly associating received dictation with the appropriate electronic record. As used herein, a "transcription" or "transcribed speech" refers to a text representation of the content of speech input. A transcription may be generated by a human transcriptionist, using automatic speech recognition, or using a combination of both.

The inventors have recognized that despite dictation systems and electronic records systems frequently being deployed as separate systems (leading to one or more of the problems identified above), a portion of each respective system (e.g., a respective client application running on the user's computing device) will typically be executed via the same operating system. For example, the "front-end," interface and/or client application of the dictation system and electronic records system that each allow access to the respective system functionality may reside on the user's computing device and, as such, the operating system on the computing device will manage various aspects of the execution of each. The inventors have appreciated that this circumstance can be exploited to allow indirect communication between a dictation system and an electronic records system that are not otherwise designed to programmatically communicate with one another, without needing the systems to be integrated or specially configured to permit direct communication between the two systems.

According to some embodiments, the operating system of a computing device on which at least a portion of a dictation system (e.g., a dictation application) and at least a portion of an electronic records system (e.g., and electronic records application) operate may be utilized to allow information from a dictation system corresponding to a dictation to be inserted into a corresponding electronic record managed by the electronic records system. The information may be used to associate the dictation with the appropriate electronic record and facilitate subsequent insertion of a transcription of the dictation into the electronic record. As a result, a transcription may be automatically associated with (and provided to) the correct electronic record without requiring the user to provide the necessary identifying information for subsequent downstream association, and without requiring integration of the dictation system and the electronic records system. Using techniques described herein, a given dictation system can be configured to communicate with virtually any electronic records system to facilitate automatic association of a dictation with its corresponding electronic record without expensive and time consuming systems integration.

The term "integration" refers herein to custom provision of programming interfaces (e.g., application programming interfaces (APIs)), or provision of other programmatic communication channels, configured to allow direct communication between applications for a specific purpose. Generally speaking, integration requires programming or re-programming each application being integrated to be configured for direct communication therebetween. For example, to integrate a first application and a second application, the first application may need to be programmed to expose an API providing desired functionality and the second application may need to be programmed to be able to utilize the exposed API. As such, integrating two applications often requires the cooperation of developers of both applications or systems, which may involve different companies or vendors or multiple different companies or vendors. Thus, integrating existing systems can be cost prohibitive and in some circumstances not possible.

The inventors have appreciated that utilizing operating system capability allows a dictation system to be configured to indirectly communicate information to a separate electronic records system to facilitate automatic association of a dictation and/or subsequent transcription with its corresponding electronic record without needing to modify the existing electronic records system. The ability to effect changes necessary to implement generally automatic association of dictations/transcriptions and electronic records via unilateral changes to a given dictation system greatly expands the circumstances in which this functionality can be implemented and/or may eliminate the need to modify a given electronic records system and/or to involve or cooperate with developers of the given electronic records system.

According to some embodiments, an automatically generated dictation marker is inserted into a corresponding electronic record using functionality provided by an operating system on which at least a portion of a dictation system and at least a portion of an electronic records system are operating. The dictation marker may include sufficient information to identify an associated dictation such that when a transcription derived from the dictation is available, the transcription can be inserted into the electronic record. For example, when a user interacts with a dictation system to produce a new dictation, the dictation system may automatically generate the dictation marker and, via the operating system, cause the dictation marker to be inserted into an electronic record managed by an electronic records system (e.g., a currently open electronic record displayed by a client-side application of the electronic records system). When the corresponding transcription is available, the dictation marker identifying the dictation can be located and the transcription, via the operating system, can be inserted into the electronic record (e.g., by at least partially replacing the dictation marker with the transcription).

According to some embodiments, transfer of information from a dictation system to a separate electronic records system may be achieved using existing operating system functionality available to applications developed for the particular operating system. For example, the same mechanism by which an operating system provides information received via one or more input devices (e.g., a keyboard or keypad) to the appropriate application may be utilized to transfer information from a dictation system (or any part thereof) to a desired electronic record managed by an electronic records system. As such, the ability to apply a transcription to the proper electronic record may be achieved without needing to modify or otherwise further develop the electronic records system.

In some embodiments, a dictation application configured to capture dictation for transcription by an associated dictation system and an electronic records application configured to allow access to electronic records managed by an electronic records system, both operate on a user's computing device (e.g., a desktop computer, laptop computer, mobile device, etc.). The electronic records application may include graphical user interface functionality that allows a user to select and open an electronic record and add information to the record using available input facilities of the computing device such as keyboard or keypad, mouse, etc. In many computing environments, such input is received by the operating system which then identifies the intended destination of the input (e.g., by identifying a currently selected window, active application, etc.) and provides the input to its correct destination (e.g., to an edit window of the electronic records application). The dictation application may be configured to cause text to be added to an electronic record to which access is provided by the electronic records application using this same operating system functionality.

In some embodiments, a dictation application may cause a dictation marker associated with a dictation to be inserted into an electronic record to which the dictation is directed. The dictation marker may include, for example, data that identifies the particular dictation, text that indicates the date of the dictation, the name of the user providing the dictation and/or any other information. For example, the dictation marker may include a unique identifier associated with the dictation that allows a subsequent transcription of the dictation to be matched with the dictation marker for insertion in the corresponding electronic record. The unique identifier may, for example, be generated by a dictation application and/or received by the dictation application from another source (e.g., from another component of the dictation system for which the dictation application captures dictation, or from elsewhere).

In some embodiments, a dictation marker includes a link (e.g., a Uniform Resource Locator (URL) or hyperlink) to a resource that provides information on dictation with which the dictation marker is associated. For example, a link provided in a dictation marker may allow a user to listen to a recording of the associated dictation. Thus, a user of the electronic records system can obtain instant (or near-instant) access to dictation content, which may be particularly useful in circumstances in which a transcription of the dictation has not yet been completed (or has been partially completed) or there is otherwise a delay resulting from the transcription process.

In some embodiments, a dictation marker inserted in an electronic record may subsequently be replaced or partially replaced with a transcription derived from the associated dictation once it is available (e.g., once it has been generated via ASR and/or transcribed by a human operator). One or any combination of the examples of data described above, including a URL, a unique identifier, etc. may be included within a dictation marker or associated with the dictation marker. A dictation marker may include textual markers, such as delimiters, that identify the beginning and/or the end of the dictation marker. For example, a particular sequence of characters may be used to identify the beginning of a dictation marker and another sequence of characters (or the same set of characters) may be used to identify the end of the dictation marker. In this way, electronic records into which dictation markers have been inserted can be readily identified.

The inventors have further appreciated that using operating system functionality to provide input to an electronic record allows authentication credentials (e.g., userid, password, encryption key, etc.) used by the dictation system and/or the electronic records system to remain decoupled. Conventionally, integrating a dictation system with an existing electronic records system requires the environments of the two systems to be sufficiently integrated to ensure that access and authentication policies are respected and users enjoy the same access privileges established for the separate systems. Techniques described herein may allow a transcription to be automatically associated with the corresponding electronic record as discussed above while permitting the user to utilize separate credentials for the dictation system and the electronics records system.

Although one envisioned application for techniques described herein relates to the health care field (e.g., medical transcription for electronic health records), it will be appreciated that the techniques described herein may be applied to other fields such as legal, business, etc., and may be applied generally to any system that utilizes dictation as a mode of entering data into an electronic records system.

Following below are more detailed descriptions of various concepts related to, and embodiments of, integration-free delivery of transcribed dictated speech. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 depicts a schematic view of an example system 100 wherein dictation is utilized as a mode of providing data to an electronic records system for which one or more techniques described herein may be applied, according to some embodiments. For example, any one or more of the methods described in connection with FIGS. 2 and 3A-B (described below) may be implemented and performed on system 100. System 100, for example, may correspond to an electronic health records (EHR) system having a dictation system that allows practitioners to dictate information directed to the EHR system. System 100 may alternatively correspond to an electronic records system for storing legal documents having a dictation system that allows attorneys to dictate legal documents to be archived and organized in the electronic records system, or may correspond to any other type of system where dictation is utilized to provide information to an electronic records system.

System 100 is configured to receive speech input from user 120, for example, to receive dictation from user 120 comprising information that the user would like applied to an electronic records system. System 100 comprises a dictation system for transcribing user dictation formed, at least in part, by a dictation application 130 and a dictation server 140 configure to communicate with one another. System 100 further comprises a electronic records system for storing a plurality of electronic records and formed, at least in part, by an electronic records application 160 and an electronic records server 170 configured to communicate with one another. The components of system 100 may be implemented on one or more computing devices and may be distributed in any manner locally or over one or more networks, as the techniques described herein are not limited for use with any particular system configuration.

System 100 comprises user device 110 having an operating system 150. Dictation application 130 and electronic records application 160 may be separate applications programmed for operation on operating system 150. Dictation application 130 and/or electronic records application 160 may be any type of application (e.g., a web application that is presented via a web or internet browser, a stand-alone network application, etc.) and may include interface functionality that allows interaction with the respective systems. For example, dictation application 130 may correspond to a client-side application or front-end for the dictation system and/or may include graphical user interface (GUI) functionality in this capacity (e.g., dictation application may include, among other features, the ability to capture dictation for transcription by the dictation system). Likewise, electronic records application 160 may correspond to a client-side application or front-end for the electronic records system and/or may include desired GUI functionality in this capacity (e.g., the electronic records application may include functionality that allow access to electronic records managed by the electronic records system).

In system 100, the dictation system and the electronic records system may be separate systems. For example, the dictation system and the electronic records system may be existing systems employed by a given enterprise (or multiple enterprises) where the respective systems were not developed to directly communicate with one another and with a minimal ability to do so, if at all. As such, transcriptions derived from dictation provided to the dictation system conventionally require certain manual intervention (e.g., a transcriptionist or some other personnel) to correctly associate a dictation and/or the resulting transcription with the corresponding electronic record and enter the transcription accordingly. However, techniques described herein facilitate configuring the dictation system or a portion thereof (e.g., dictation application 130 and/or dictation server 140) to be able to cause a dictation and/or resulting transcription to be associated with the correct electronic record of the electronic records system without requiring this manual intervention, without requiring the user to explicitly dictate sufficient identifying information and/or without needing to integrate the dictation system and the electronic records system, as discussed in further detail below.

According to some embodiments, dictation application 130 may be configured to cause the operating system 150 to provide information to the electronic records application 160 to facilitate automatic association of a dictation with a corresponding electronic record. For example, dictation application 130 may be configured to cause operating system 150 to insert a dictation marker into a corresponding electronic record via electronic records application 160, which dictation marker can be identified such that a subsequent transcription derived from the dictation can be inserted into the electronic record using the same or similar mechanism (e.g., via functionality of operating system 150).

Using such techniques, dictation application 130 may be configured to perform operations (e.g., add, delete and/or update operations) on electronic records stored in electronic records database 171 without requiring the dictation system and the electronic records system to be integrated (such as by providing direct communication between the systems using APIs) and/or without needing to modify the electronic records system. Instead, dictation application 130 may be configured to utilize the operating system to achieve desired communication with the electronic records system, examples of which are discussed in further detail below.

According to some embodiments, operating system 150 may write text to an edit control provided by the electronic records application 160, such as an interface element (e.g., a window) that allows text to be entered and/or edited. In this respect, the electronic records application 160 may be provided with information from the dictation system using the same or similar mechanism that the operating system uses to convey information received from an input device, such as text entered into the edit control via a keyboard, keypad, mouse, clipboard, etc. Thus, the dictation application 130 can communicate information to the electronic records application 160 using existing capabilities of operating system 150.

User device 110 (e.g., a personal computer, laptop computer, mobile device such as a smart phone, personal digital assistant, etc.) is configured to receive speech input from user 120, which may be provided in any suitable form. For example, user 120 may provide speech input to user device 110 by speaking into a microphone (which may be part of user device 110 or coupled to user device 110). User device 110 may, alternatively or additionally, access a recording (e.g., on tape, stored in a file, etc.) that was previously dictated. Irrespective of how the speech input is provided to user device 110, dictation application 130 may obtain the speech input and, in cooperation with dictation server 140, produce a transcription of at least a portion of the speech input. Dictation application 130 may, in some embodiments, be configured to begin and/or cease receiving speech input in response to a command from a user, such as a voice command or a user activating a user interface element provided by user device 110.

Dictation server 140 may be configured to receive speech input from dictation application 130 and to generate a transcription of the speech input using ASR, one or more transcriptionists or a combination of both. In some embodiments, the speech input is pre-processed (e.g., by dictation application 130, by another application executing on user device 110) before being provided to dictation server 140, either from a signal processing standpoint or to add any desired identifying information to the dictation (e.g., to associate with the dictation a unique job identifier that may also be included in a dictation marker inserted into a corresponding electronic record).

Dictation server 140 may utilize transcription service 141 and/or Automatic Speech Recognition (ASR) service 142 to generate a transcription of the user's speech (or a pre-processed version thereof, as discussed above). For example, ASR may be performed on the speech input to generate a draft transcription of a speech input, and a human-operated transcription service may review the resulting draft for errors and, where appropriate, make corrections to the errors, thereby producing a transcription of the user's speech. However, ASR may be used alone without human transcribers or human transcribers may be used alone without ASR. In general, any combination of the ASR service and/or transcription services may be used to generate the transcription of the dictation from the user.

Transcription service 141 and ASR service 142 may include software and/or hardware executed by the dictation server 140, and alternatively or additionally either or both transcription service 141 and ASR service 142 may include hardware and/or software executed by one or more separate servers that are in communication with dictation server 140. For example, dictation server 140 may provide speech input to another server, which provides ASR results back to the dictation server. As another example, a portion of an ASR process may be performed by an ASR service executing on dictation server 140, with the remainder of the ASR process being performed by another server. In this example, the dictation server might perform extraction of features from a speech input and provide the features to the other server to determine a transcription of the speech input based on the features.

Dictation server 140 may, in some embodiments, be configured to manage the workflow of transcribing dictation. This may include generating an identifier corresponding to a particular "job" to convert a particular speech input into a transcription of that speech input, or otherwise keeping track of one or more jobs, managing the completion of pending jobs, monitoring the status of jobs and/or routing jobs to appropriate ASR and/or transcription services.

A user may access electronic records database 171, hosted on electronic records server 170, using electronic records application 160 operating on user device 110. Although electronics records server 170 is depicted in FIG. 1 as a single server, it may also include a cluster of servers operating together to provide electronic records functionality. Electronic records application 160 may include any application configured to perform additions, deletions, updates and/or edits of one or more records in the electronic records database 171 (including to data fields of a record and/or to metadata associated with a data field).

In some embodiments, electronic records database 171 is configured to authenticate users and have a security model that allows particular restrictions of operations (e.g., add, delete, update and/or edit) to one or more authenticated users at the record level. For example, a particular user may, under an exemplary security model, have permission to add new records, to edit records they created, but not have permission to delete any records. Records may additionally be characterized by one or more groups within electronic records database 171, and the database may be further configured to restrict user operations for records at the group level. For example, a user may, under an exemplary security model, have permission to add new records characterized by a first group (e.g., "Patients") but not have permission to add new records characterized by a second group (e.g., "Procedures").

Electronic records application 160 may be configured to provide authentication credentials to electronic records server 170 and/or electronic records database 171 in order that one or both may determine which permissions, if any, that user has for access to particular records. For example, a user's credentials may be forwarded to the electronic records server 170 and/or electronic records database 171 and a security model describing the user's permissions may be selected for records and/or for one or more groups.

As discussed above, operating system 150 resides on user device 110 and allows for applications, and more particularly, dictation application 130 and electronic records application 160, to execute on user device 110. For example, operating system 150 may be a Microsoft Windows operating system and dictation application 130 and electronic records application 160 may both be Windows applications developed for the Windows operating system. In general, however, operating system 150 may include any suitable operating system, including mobile operating systems such as Apple iOS and/or Android. It should be appreciated that techniques described herein may be utilized in any environment where at least a portion of a dictation system and at least a portion of an electronic records system are operated by the same operating system.

Dictation application 130 may perform any number of any type of operations on a record stored in electronic records database 171 via electronic records application 160 (which is in turn performed by accessing operating system 150) in response to receiving speech input and/or in response to some other event. For example, speech input from user 120 may result in dictation application 130 adding text to a record via the electronic records application, and subsequently the dictation application may modify the text in that record.

Operations on a record may be triggered by any suitable event, including but not limited to: receiving speech input; receiving data (e.g., a transcription, identifying information, status information, etc.) from dictation server 140 in response to speech input provided to the dictation server; a record being opened for editing, such as by a user with permission to write to the record (e.g., a first user whose speech input previously caused text to the written to the record, or a different user, who may be accessing the record via a different user device from the first user); a user operation being performed within the dictation application 130 (e.g., clicking on a button in an interface that results in an operation by the dictation application within a record); and/or the dictation application performing an update to a record in response to analyzing the content of the record (which may be initialized automatically and/or in response to a user request).

In some embodiments, dictation application 130 is configured to provide metadata to an electronic record via operating system 150 communicating with the electronic records application 160. Metadata refers generally to any data provided to the electronic record by the dictation application other than a final (e.g., non-draft) transcription of dictation associated with the electronic record. For example, metadata written to an electronic record may include a status indicator, a URL, an identifier of a job corresponding to a dictation, a draft transcription of a speech input, or combinations thereof. Metadata written to an electronic record using techniques described herein (e.g., provided by dictation application 130 via the operating system 150) may additionally or alternatively include information descriptive of a dictated speech input. For example, metadata may include an indication of: the date and/or time of a speech input, a name and/or userid of a user who provided the dictation, a status of a transcription process (e.g., "Pending," "Draft," "Completed"), an identifier that identifies the speech input (e.g., an identifier that is unique within the organization using the electronic records database, and/or globally unique), and or any other information.

In some embodiments, metadata written to a record by dictation application 130 functions as a dictation marker that acts as a placeholder for the eventual transcription of corresponding speech input. Since there is typically a delay (e.g., transcriptions are typically not generated in real time and may sometime experience a non-trivial time delay) between the dictation application receiving speech input and completion of a transcription of the speech input by the dictation system (e.g., completion of the transcription by dictation server 140 will take some finite amount of time, which may be relatively substantial if human-operated transcription service 141 is utilized), a dictation marker may be inserted into the electronic record and subsequently replaced, in part or in whole with, with the transcription once it is available.

The dictation marker may be identifiable in any suitable way, including by including one or more identifiable marks, referred to herein as delimiter(s), that facilitate identifying the dictation marker and/or differentiating the dictation marker from other content in the electronic record. For example, textual markers may be included that delimit the beginning and/or end of the dictation marker. Delimiters may, for example, be chosen to be character sequences that have a low probability of occurring in an electronic record to avoid misrecognition of text as a dictation marker when it is, in fact, not a dictation marker. For example, a dictation marker may include "{{{" as the first three characters and "}}}" as the final three characters, allowing the dictation marker's bounds to be identified while minimizing the chance of other content within the electronic record being mischaracterized as a dictation marker.

In general, however, any suitable methods of defining the bounds of the dictation marker may be used, including using a length prefix or suffix (e.g., beginning a 100-character dictation marker with "{{{100") to denote the beginning or end of the dictation marker and the number of characters that are contained within the dictation marker (which may, for example, mitigate the need for a delimiter at the beginning or end of the dictation marker). The dictation marker may also include any suitable metadata to indicate that a transcription is forthcoming, to mark where subsequent dictation should be inserted, to allow the electronic record awaiting a transcription to be readily identified, to allow access to the speech input, to provide status information, and/or to provide any other data that may be relevant to the dictation and/or the pending transcription.

As discussed above, dictation application 130 may initiate updates to a record stored in electronic records database 171 via electronic records application 160 subsequent to speech input from a user being received by the dictation application. In some embodiments, such an update may replace all or part of a dictation marker previously added to the record. Thus, a dictation marker used as a placeholder for a transcription of a speech input may be replaced with the transcription once it is available. However, updates to electronic records stored in electronic records database 171 may be performed in any suitable way, and are not limited to operations performed by dictation application 130. For example, an automated process executed by the electronic records database 171 may perform replacement of a dictation marker with a transcription.

In some embodiments, metadata written to an electronic record (e.g., provided within the bounds of a dictation marker or otherwise) includes one or more URLs, which may include one or more hyperlinks. A URL may be included in metadata to provide a link to one or more webpages (or other resources) that provide additional information on a dictation associated with to the metadata. For example, speech input received from a user may be transferred to an online location that is accessible from a webpage having a URL that is provided in or with a dictation marker. This may allow a user with read access to the record to access the speech input of the user (e.g. by clicking on the URL), which may allow near-instant access to speech input by any user of the system (with suitable permissions, should they be required by the electronic records database). An online resource (e.g. a webpage) linked to by a URL may include status information relating to the transcription of a speech input, such as but not limited to, a draft transcription (e.g., one produced by ASR but not yet reviewed by a human transcriptionist), a status indicator of the transcription process (e.g., "pending," "complete," "draft"), a date and/or time at which the speech input was provided, an estimate for when the transcription is to be complete and/or any other information.

In some embodiments, a dictation marker inserted into an electronic record includes one or more non-constructible strings. Since, as discussed above, metadata may, in whole or in part, be subsequently replaced with transcription of a speech input, and/or may include a link to information relating to a speech input, it may be beneficial to ensure that a user of the system cannot manually create valid metadata. If manual creation were feasible, a user without permission to read certain electronic records (e.g., patient records in a medical electronic records system), could manually create a dictation marker in an electronic record so that the electronic record is subsequently updated with a transcription for which it was not intended. If this occurred, the user might have circumvented the security configuration of the electronic records database by accessing information (the transcription) that the database is configured to block from that user. Therefore, in some embodiments, metadata may include a non-constructible string which has a low probability of being created by a user, whether accidentally or by design. A non-constructible string may be generated in any suitable way, some examples of which are provided below.

Figure 2:
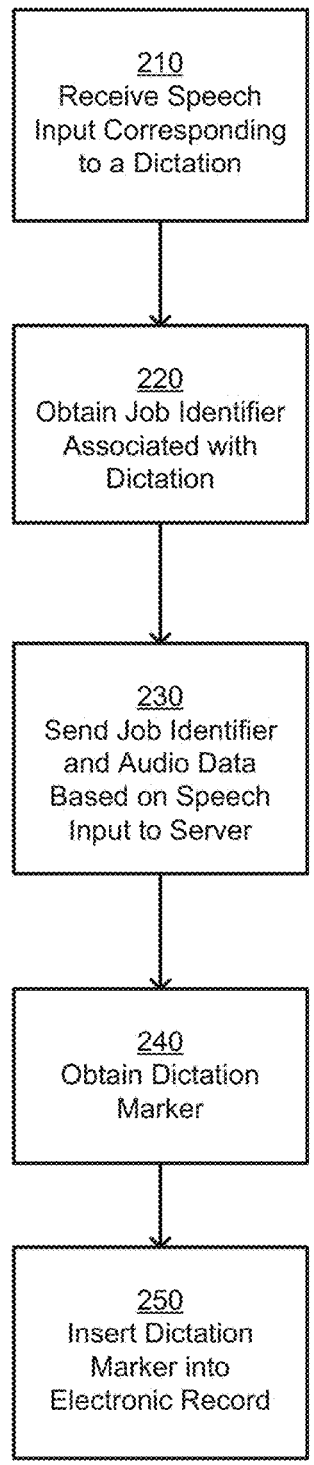
FIG. 2 illustrates a method of writing a dictation marker to an electronic record, in accordance with some embodiments.

FIG. 2 illustrates a method of providing a dictation marker to an electronic record, in accordance with some embodiments. In act 210, speech input is received by the user device. For example, the user may provide dictation to the user device. The speech input may include any suitable representation of a user's speech and may be received by the user device using a microphone coupled to the user device, and/or by receiving a recording (e.g., a digital recording, via tape, etc.). For example, speech input may include audio captured by a microphone coupled to a user device and digitized by the user device. The user device described in connection with method 200 refers to the computing device (e.g., hardware) and/or relevant software/firmware/microcode operating on the computing device, including the operating system of the computing device.

In act 220, a job identifier associated with the dictation is obtained. The job identifier may be generated by the user device that received the speech input in act 210, or may be generated by another device or component of the system and provided to the user device. The job identifier may be, or may include, an identifier that uniquely identifies the dictation, such as an identifier that is unique within a dictation system and/or an electronic records system being used in the context of method 200, and/or may be globally unique (e.g., a globally unique identifier). The job identifier may, in some embodiments, be generated automatically and provided to the user device in response to a user providing dictation and/or providing an indication that dictation is forthcoming. In some embodiments, the user device generates a globally unique identifier that is used as the job identifier, such as but not limited to, obtaining a globally unique identifier from an operating system executing on the user device, generating a globally unique identifier from a random number, generating a globally unique identifier from any other globally unique value (e.g., the date and time, such as at a nanosecond resolution), or combinations thereof.

In act 230, the job identifier obtained in act 220, and audio data based on the speech input received in act 210, are sent to one or more servers (e.g., via one or more networks). The one or more servers may be any servers that together provide a service of producing a transcription based on audio data corresponding to a dictation, which may include ASR services and/or transcription services. The job identifier may, in some embodiments, be provided to a first server (e.g., a database server) whereas the audio data is provided to a second server (e.g., that provides ASR and/or transcription services). The audio data may be identical to the speech input received in act 210, or may include any audio data derived from the speech input. For example, the audio data may be obtained by preprocessing the speech input (e.g., to improve sound quality, adjust volume, etc.) by the user device, or otherwise.

In act 240, a dictation marker is obtained by the user device. The dictation marker may be generated by the user device, or may be generated elsewhere (e.g., received from another device), such as, but not limited to, one or more servers to which the job identifier and/or audio data were sent in act 230, or a different server. As discussed above, a dictation marker may include an identifier and/or one or more delimiters denoting the beginning and/or end of the dictation marker. In some embodiments, the dictation marker includes the job identifier obtained in act 220 and includes one or more delimiters, which together may allow the dictation marker to be identified by a subsequent process based on the job identifier, and replaced (in part or in whole)

with a transcription for the dictation for which the job identifier was generated. The dictation marker obtained in act 240 may optionally include other metadata, some examples of which were discussed above and/or in further detail below (e.g., URL, status, etc.)

In act 250, the dictation marker obtained in act 240 is written to an electronic record. Writing the dictation marker to the electronic record may be performed without integrating relevant software applications executing on the user device (e.g., without needing to integrate portions of a dictation system with portions of an electronic records system operating on the user's computing device). In act 250, the dictation marker is inserted into the electronic record, for example, by utilizing an operating system of the user device as discussed above. The dictation marker may be inserted into any suitable location in the electronic record, including but not limited to, at the beginning of the record, at the end of the record, or at a cursor location in the record, for example, if the record is simultaneously open for editing on the user device (e.g., via an editing window). In this way, the electronic record can be set up for subsequent insertion of a transcription derived from the audio data when available in a similar manner, as discussed in further detail below.

Figure 3:
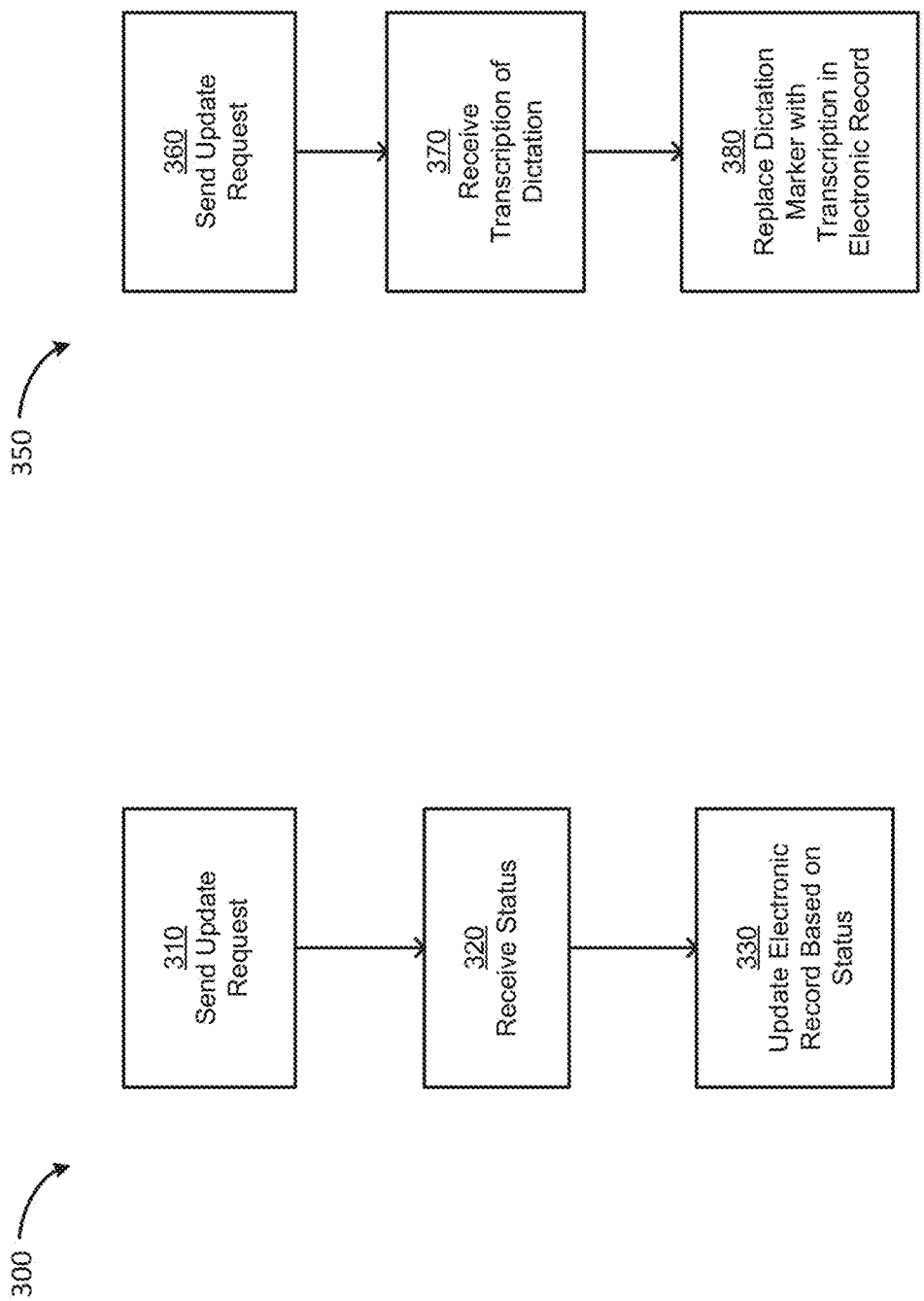
FIGS. 3A and 3B illustrate methods of updating a dictation marker, in accordance with some embodiments.

FIGS. 3A-B illustrate methods of updating a dictation marker, in accordance with some embodiments. Method 300 may be performed at any time subsequent to inserting a dictation marker in an electronic record (e.g., subsequent to performing method 200), by the same user or by a different user, on the same user device or on a different user device, to add further information regarding a dictation to a corresponding electronic record.

Method 300 may begin by performing act 310, in which an update request is sent from a user device to one or more servers in order to determine whether transcription of a dictation is available. For example, the update request may include a job identifier as described above in relation to FIG. 2 that serves to identify the relevant dictation. One or more servers receiving the request may perform a lookup using the received job identifier to determine a status of the transcription job associated with that identifier.

In act 320, a status is received from the one or more servers. In the example of FIG. 3A, when the update request is received from the one or more servers, a transcription of the dictation has not yet been completed (e.g., via ASR and/or by a human transcriptionist). The status may indicate the progress of the transcription process, and may include words/text, graphical data, colors, etc. that indicates the progress and which an update to an electronic record may be based upon. Suitable text for a status may, for example, include "Pending," "Draft," "Complete," "25% Complete," etc. Additionally, or alternatively, the status may comprise a draft transcription of the dictation and/or text associated with the draft (e.g., a date and/or time at which the draft was generated). A received status may be used to update any portion (including all) of a dictation marker within an electronic record and/or to update any portion (including all) of metadata within an electronic record.

In act 330, an electronic record is updated based on the status received in act 320. An update may comprise one or more of: adding and/or replacing text in the electronic record with all or a portion of text contained within the received status, adding graphical data from the received status to the electronic record, changing the color of text within the electronic record based on the received status, or combinations thereof. For example, a status indicator of "Draft," a draft transcription of a dictation and a date and time at which the draft was generated may be received for a dictation associated with an electronic record having a dictation marker that includes a "Status: Pending" indicator. In this example, the electronic record may be updated to replace the word "Pending" with the new indicator of "Draft" (so that the record reads in part "Status: Draft"), and the date and time along with any desired explanatory text (e.g., insert "Date of Draft: 06/30/2014 09:25 am") may be inserted with or without the draft transcription.

It should be appreciated that an update to a dictation marker may be performed in any situation. For example, an update may be performed when the user device is alerted that a draft transcription is available (e.g., from an ASR system) or is notified of any change regarding the status of the dictation. As such, performing an update is not limited to being performed in response to any particular circumstance and can be done automatically or in response to user request.

Method 350 illustrates a method in which a dictation marker in an electronic record is replaced with a transcription of a dictation. For example, method 350 may be performed to insert a completed transcription into an electronic record for which a dictation marker was previously added (e.g., by performing method 200), and may be performed by the same user or a different user, and on the same user device or on a different user device. Additionally, method 350 may be performed after an electronic record has been updated one or more times by a same or different users of a same or different user devices. As a non-limiting example, a dictation marker may be inserted into an electronic record by a first user utilizing a first user device, an update to the electronic record may be subsequently performed by the same user utilizing a second user device, and the completed transcription may be subsequently provided by a second user utilizing a third user device, or all actions taken in this respect may be performed by the same user on the same user device or taken by any number of different users and/or user devices.

Method 350 may begin by performing act 360, in which an update request is sent from the user device performing method 350. The update request may be sent to one or more servers in order to determine whether a transcription of a dictation is available in a manner similar to that described above in connection with act 310. In act 370, a transcription of the dictation is received by the user device. In the example of FIG. 3B, when the update request is received by the one or more servers, a completed transcription has been completed (e.g., via ASR and/or by a human transcriptionist) and the one or more servers provide the transcription to the user device in act 370. It should be appreciated that a completed transcription may be provided to a user device without needing an update request. For example, a dictation system may be configured such that when a transcription is completed, it is automatically sent to one or more user devices or otherwise pushed to a user. Alternatively, a dictation system may be configured to automatically generate an alert or other indication that the transcription associated with a particular job is completed and can be retrieved.

In act 380, a dictation marker in an electronic record is replaced (in part or in full) with the transcription received in act 370. It should be appreciated that any of the updates to the electronic record described above in connection with FIGS. 3A and 3B, including the replacement of the dictation marker with the completed transcription, may be performed using the same techniques by which the dictation marker was inserted into the electronic record (e.g., by requesting that the operating system insert the desired information via its existing ability to communicate with relevant portions of an electronic records system.) As such, a dictation marker may be added, one or more edits may be performed and/or a transcription may be provided to the correct electronic record without needing to integrate the electronic records system with the dictation system by which the dictation was captured.

Replacement of a dictation marker (in part or in full) with the corresponding transcription may be triggered by any number of suitable events, which may include automated as well as manual (e.g., user-initiated) events. For example, triggers may involve any one or combination of software executing on the user device scanning electronic records (e.g., those open for editing) for a dictation marker and performing a replacement when a dictation marker is identified for which a completed transcription is available; a user requesting that software executing on a user device perform a scan of electronic records to search for dictation markers for which transcriptions are available; a user requesting that software executing on a user device perform a scan of a particular electronic record for a dictation marker in response to receiving a completed transcription or an indication that a transcription is available; and/or in any other suitable manner.

Figure 4:
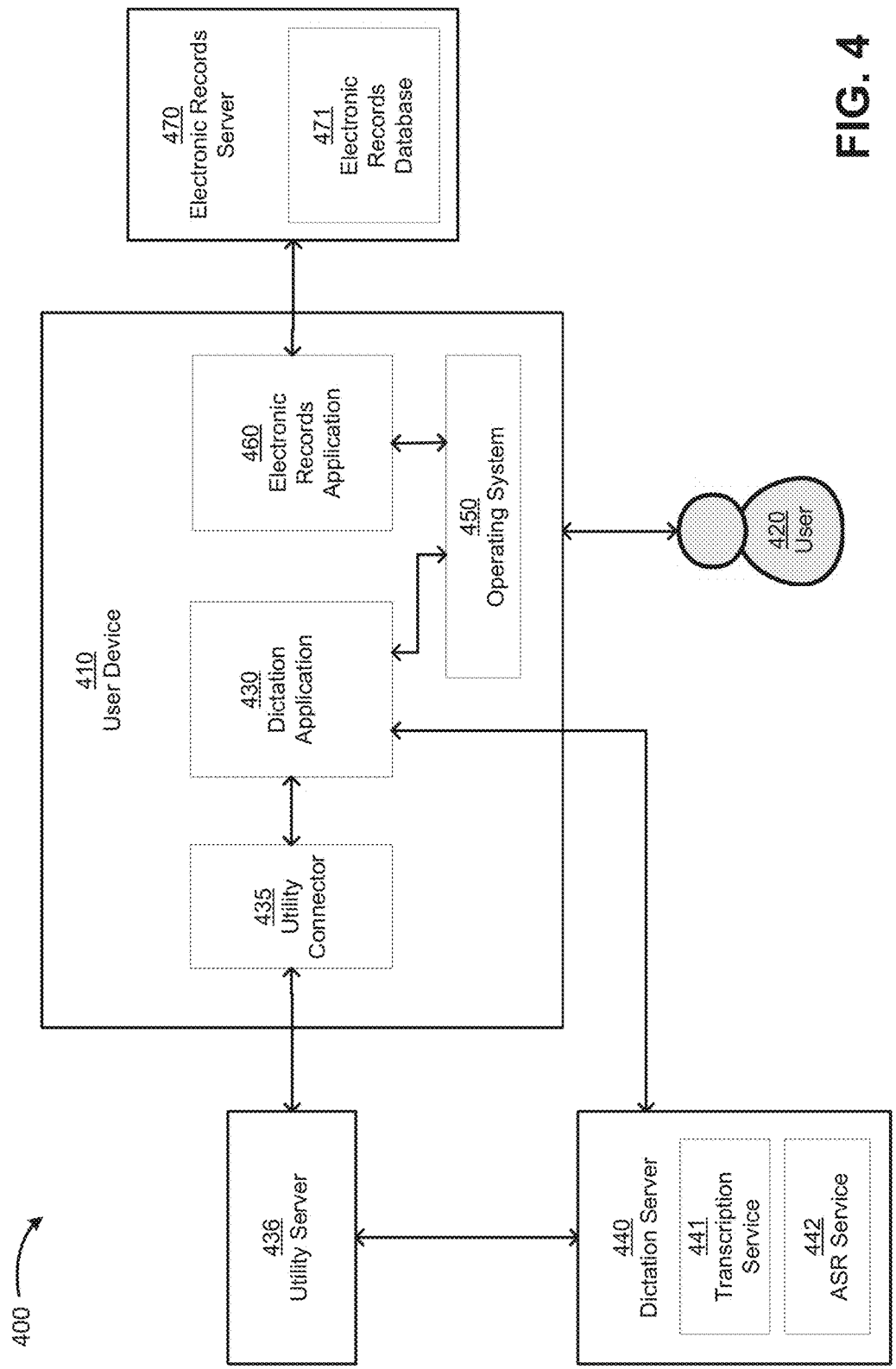
FIG. 4 depicts an additional exemplary configuration of a system wherein dictation is utilized as a mode of providing data to an electronic records system, according to some embodiments.

FIG. 4 depicts an alternative configuration of the system described in connection with FIG. 1. Any of the techniques described herein (e.g., one or more of the methods described in connection with FIGS. 2 and 3A-B) may be implemented and performed on system 400. System 400 is similar in many respects to the system illustrated in FIG. 1, however, system 400 includes utility server 436, which performs some of the functionality performed by dictation server 140 in system 100 illustrated in FIG. 1.

In the example of FIG. 4, management of dictation jobs (e.g., keeping track of which jobs have been created, which are pending, are completed, generating identifiers for those jobs, routing jobs to the appropriate destination, etc.) is performed by utility server 436. In the example of FIG. 4, dictation server 440 provides services relating to conversion of a dictation into text, which includes both ASR and transcription resources. System 400 may have an advantage over system 100 in that management of dictation jobs is performed by a separate server from the server that performs transcription.

Utility server 436 may utilize any suitable technology that can provide the above described functionality, such as, but not limited to, business management software such as SAS. Utility connector 435 is software that executes on operating system 450 and is configured to allow user device 410 to communicate with utility server 436. For example, utility connector 435 may include a Windows operating system-based connector for SAS.

FIGS. 5A-F illustrate a series of user interface elements of a dictation application and a separate medical records application displayed on a user device on which the respective applications operate. The user interfaces presented in FIGS. 5A-F are depicted as executing within an operating system that utilizes tiled or overlapping windows, but in general the techniques described herein are not so limited. For example, the techniques and processes depicted by FIGS. 5A-F could have equally been demonstrated as operating on a mobile operating system having a different paradigm for presenting user interface elements. Furthermore, while the examples of FIGS. 5A-F are illustrated in the context of a medical electronic records system, the same techniques could equally be applied to an electronic records system being used in the context of another field.

Figure 5B:
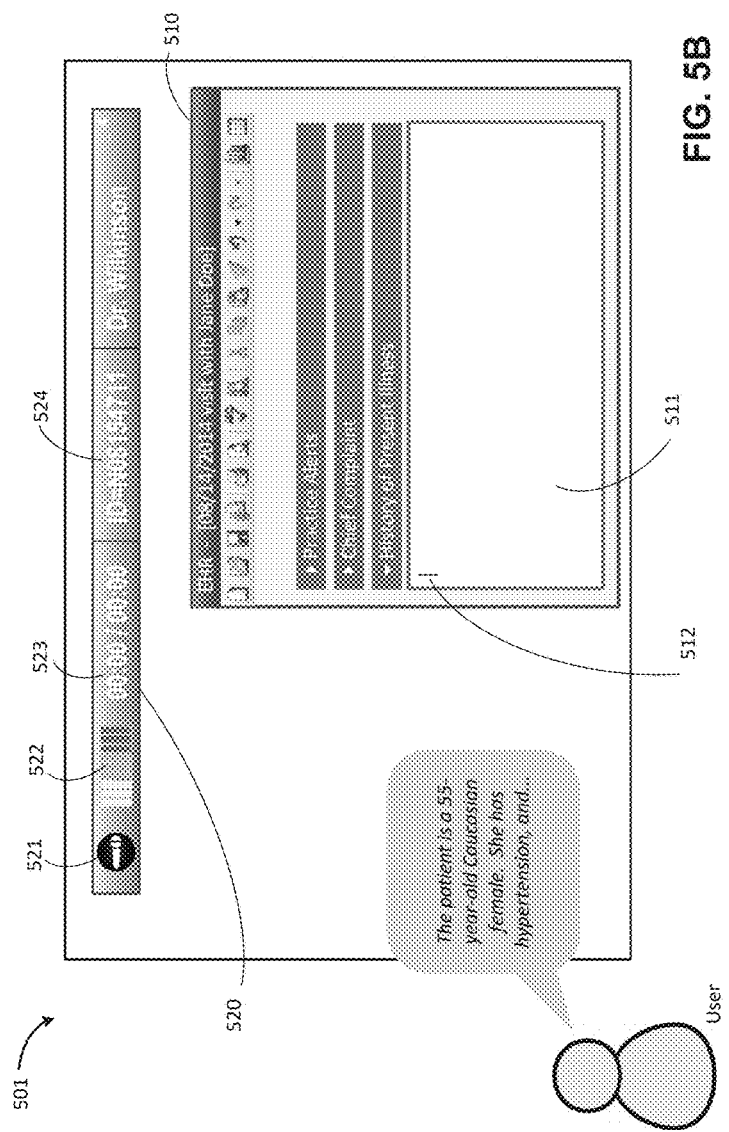

In FIGS. 5A-5F, a dictation application associated with a dictation system and an electronic records application associated with an electronic health records system, each developed for the operating system of a user device, respectively provide user interfaces, namely electronic records application interface 510 and dictation application interface 520, respectively. In the example of FIG. 5A, a dictation application is executing but is not currently processing or receiving speech input, and an electronic records application is accessing an electronic health record for a patient named "Jane Doe," information from which is presented via interface 510. Dictation application interface 520 includes button 521 that, when activated (e.g., by clicking) causes the dictation application to begin receiving speech input (e.g., by capturing audio input to a microphone attached to the user device). In the example of FIGS. 5A-F, the user device is being operated by a user named "Dr. Wilkinson".

The electronic records application interface 510 allows a user to access to one or more records stored in an electronic records database (e.g., such as electronic records database 170 discussed above in relation to FIG. 1). As discussed above in relation to FIG. 1, an electronic records application may enforce a permissions scheme, the details of which are not shown, and it can be assumed that Dr. Wilkinson has the appropriate permissions to both read and edit the record shown in the figure. In the example of FIG. 5A, the user has selected a portion of the electronic health record regarding "History of Present Illness," which currently does not include any information, and has activated the record for editing (e.g., clicked in window 511), as shown by cursor 512.

As shown by user interface 501 in FIG. 5B, the user has activated button 521 to cause the dictation application to begin receiving speech input, which causes the dictation application to display volume level 522, timer 523 and job identifier 524 via interface 520. The job identifier "N08154711" is an exemplary unique identifier associated with the dictation initiated via activation of button 521. The job identifier may be obtained in any suitable way, some examples of which are provided above. For example, the job identifier may be generated by the dictation application, or may be received from another component of the dictation system (e.g., a dictation server) or elsewhere.

In the example of FIG. 5B, the user begins speaking into a microphone coupled to the user device, which causes the dictation application to receive speech input (e.g., the user's digitized utterance received by the microphone). Once the user has completed the dictation, she activates button 521 or otherwise indicates that the dictation is complete (e.g., using a voice command). An exemplary dictation is depicted at the bottom-left of FIG. 5B.

Figure 5C:
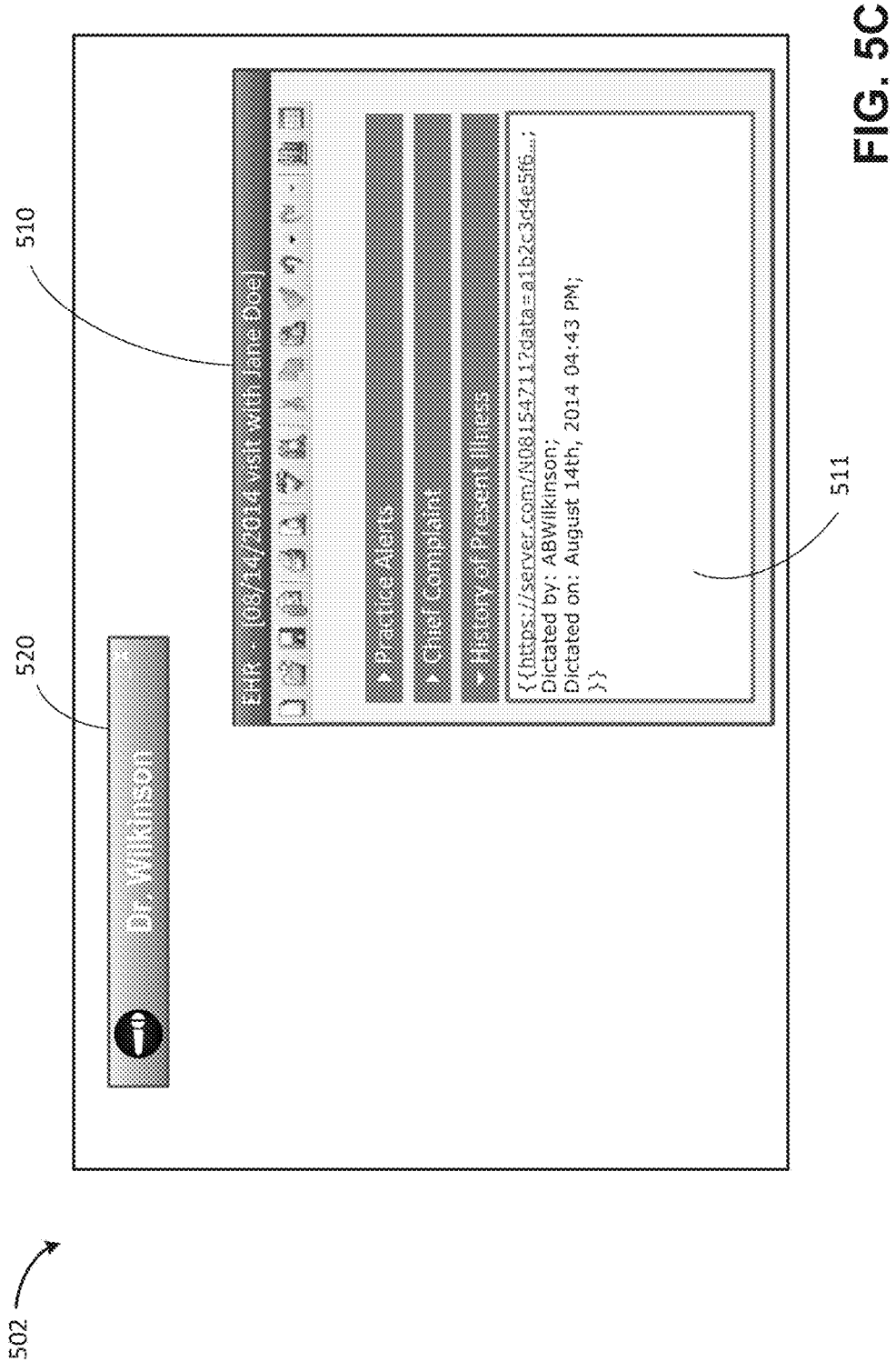

In user interface 502 shown in FIG. 5C, dictation application interface 520 has hidden the elements 522, 523 and 524 shown in FIG. 5B, indicating that the dictation application is not presently capturing dictation. As shown by interface 510 of the electronic health records application, a dictation marker including double bracket delimiters and an indication of when the dictation was captured are inserted into edit control 511 of user interface 510. As the dictation application and the electronic health records application are not integrated, there is no direct way for the dictation application to insert this information into the electronic health record. However, using techniques described herein, the dictation application can cause the operating system to insert this information using the existing interface functionality of the operating system being utilized by the electronic health records application. For example, the dictation application can provide desired information to the operating system which in turn inserts the information into edit control 511 in the same manner as if the information had been entered via a keyboard, keypad or other such input device.

It should be appreciated that the process described above is similar to how a user would usually enter data into a record manually (e.g., without providing any speech input): the user opens the record and activates an edit control but instead of typing the information, dictates it instead. Since the dictation marker is later replaced with a transcription of the dictation (as shown below), the user is effectively capable of dictating into the electronic record, yet no integration between the electronic records system and dictation system is necessary.

The exemplary metadata shown in FIG. 5C includes a URL within the dictation marker, and the URL in turn includes the job identifier "N08154711." In the example of FIG. 5C, the metadata includes only a dictation marker although, as discussed above, in general, metadata inserted into an electronic record may include a dictation marker in addition to other metadata, examples of which are discussed herein. As discussed above, the URL within the dictation marker may be activated (e.g., clicked on) by a user which causes a resource, such as a web page, to be accessed that may contain information regarding the transcription job of the associated dictation (including, in some embodiments, a link to the dictation so that it can be played back). While a secure Hypertext Transport Protocol (HTTP) link has been depicted in the example of FIG. 5C, in general any protocol may be used to provide a link to any resource on any network (including the Internet and/or a local network). The string beginning "data=a1b2c3d4e5f6 . . . " in the URL shown in FIG. 5C is an exemplary non-constructible string that, as described above, may be written to the record to ensure that a user cannot manually create a valid link to view job information, listen to a dictation, access a transcription, etc.

In user interface 503 shown in FIG. 5D, the metadata has been supplemented with status information and a draft transcription of the dictation (e.g., a real time or near real time transcription performed by ASR). As discussed above, an update operation that provides status information may be performed by the user device (e.g., automatically or in response to a user action), may be performed by a different user device, or may be performed by a server process (such as the electronic records database). An update operation has therefore been performed in the example of FIG. 5D, causing the dictation marker shown in FIG. 5C to be updated with additional text relating to the job of transcribing the associated dictation. For example, an ASR system completing a draft transcription may automatically trigger the update, and as a result, the user may be able to view a transcription of the dictation in the electronic record in real time or in near real time as if the user were dictating directly into the electronic health record.

Figure 5E:
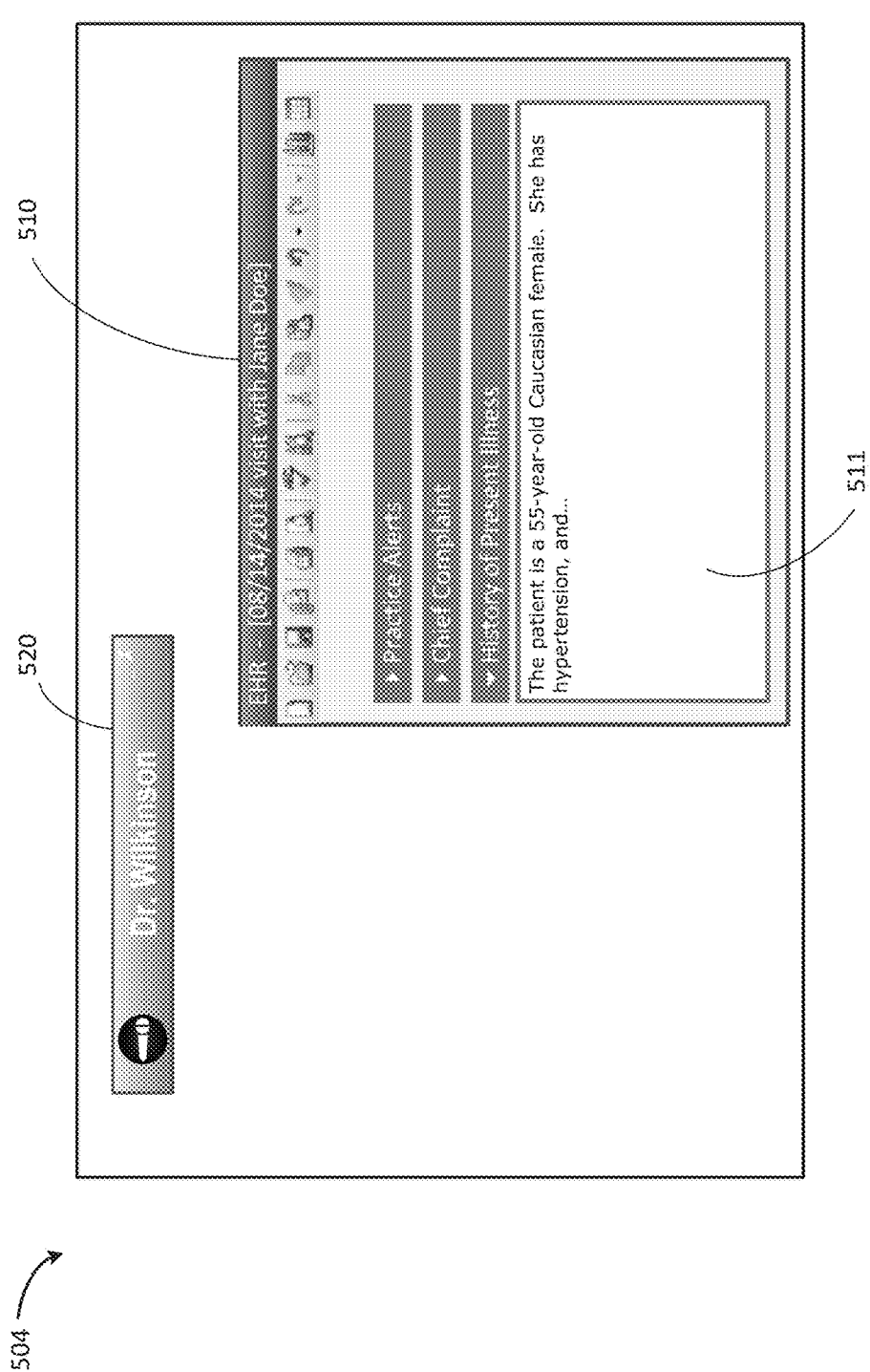

In user interface 504 shown in FIG. 5E, a subsequent update has been performed to the record to replace the dictation marker with a completed transcription of the dictated speech. As discussed above, the update operation may be performed by the user device (e.g., automatically or in response to a user action), may be performed by a different user device, or may be performed by a server process (such as the electronic records database). As such, the user is able to dictate via a dictation system and have the transcription inserted into the correct electronic record of an electronic records system without integrating the separate systems.

Figure 5F:
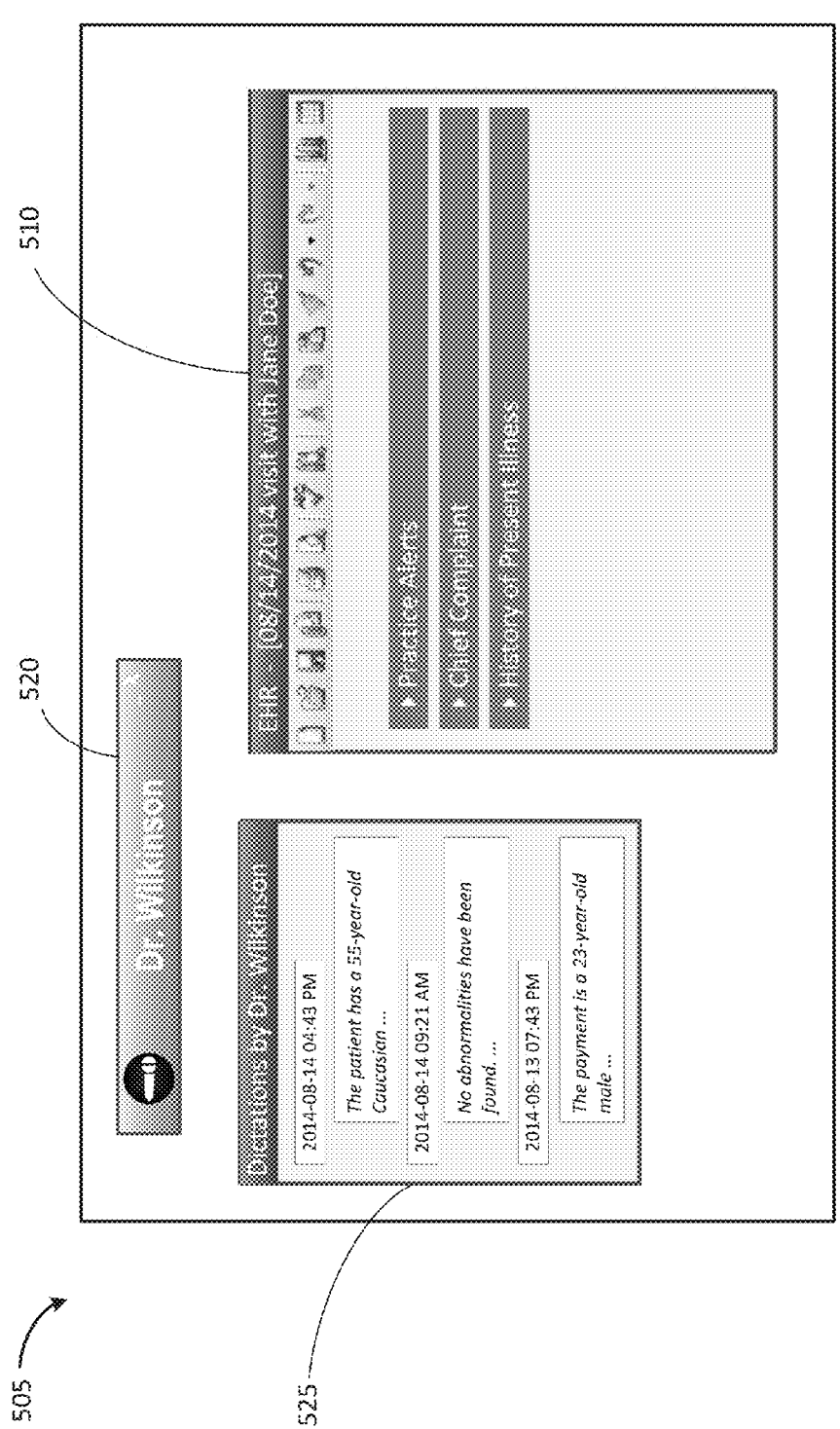

FIG. 5F illustrates a function of the dictation system that keeps track of dictations provided by the user, as shown in window 525. In the example of user interface 505, Dr. Wilkinson's dictations are listed along with the date and time that she provided them and a draft transcription of the dictation. The dictation application may, in some embodiments, additionally or alternatively provide information on dictations by users other than the user of the user device.

Figure 6:
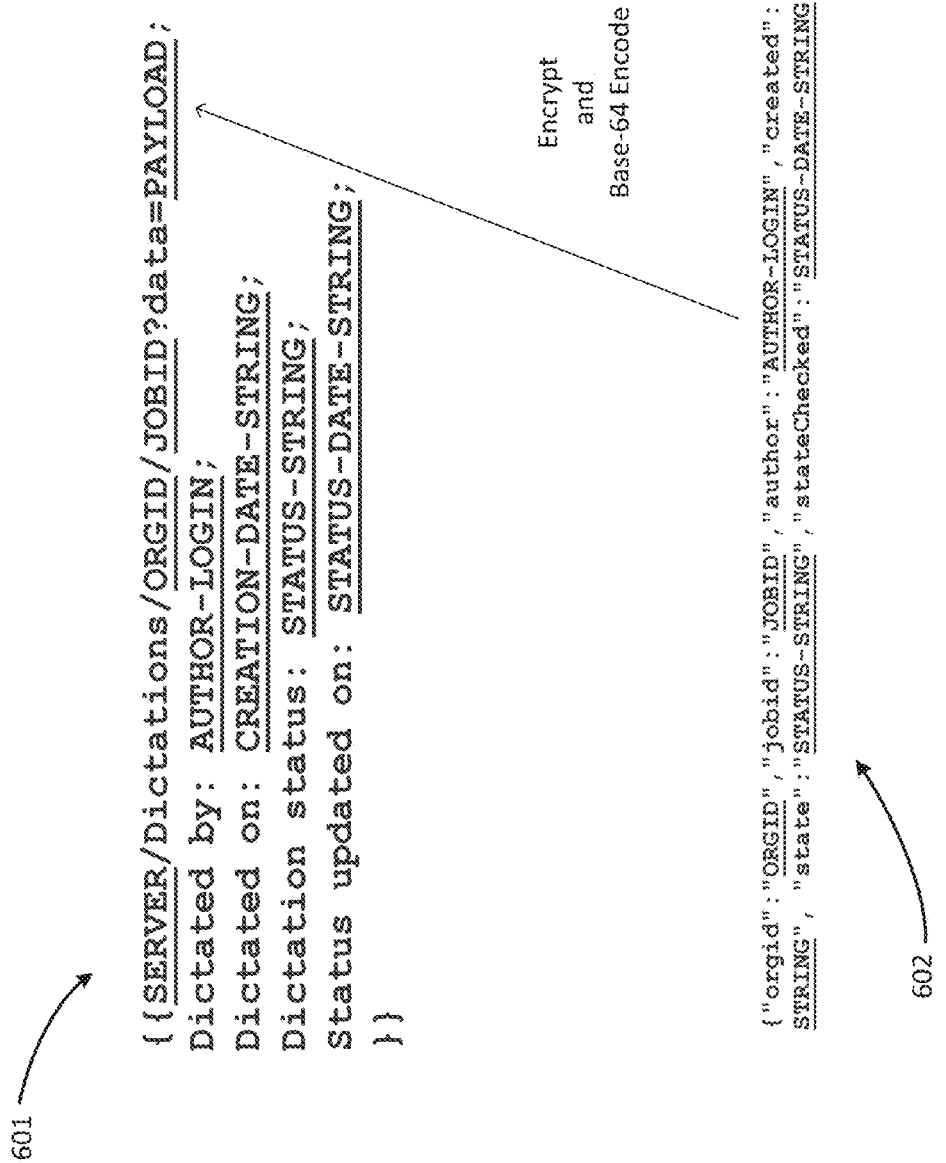
FIG. 6 illustrates an exemplary format of a dictation marker, according to some embodiments.

FIG. 6 illustrates an exemplary format of a dictation marker, according to some embodiments. Dictation marker format 601 is an exemplary dictation marker format that includes text in addition to fields that are filled in when a dictation marker is generated and populated. These fields are shown in FIG. 6 as capitalized underscored words, such as "SERVER". As discussed above, a dictation marker may be constructed using any suitable format, and dictation marker format 601 should not be viewed as in any way limiting the dictation marker formats available for use in connection with techniques described herein.

In the example of FIG. 6, the dictation format includes a field SERVER that holds the name of a server. For example, a dictation marker following the format shown in FIG. 6 may begin with "{{http://myserver.com/Dictations/". ORGID is a name of an organization that uses the electronic records system associated with the dictation marker format, and may be used to allow a single structural organization (e.g., a medical network, a law firm) to separate out dictations using divisions in that organization (e.g., a hospital, a law office). JOBID is a unique identifier for a dictation associated with the dictation marker.

PAYLOAD is a non-constructible string that, in the example of FIG. 6, is constructed by generating string 602 based on the same field values used in the body of the dictation marker 601, encrypting the string and then base-64 encoding the result. The resulting payload value is therefore alphanumeric and suitable for use in a URL (due to the base-64 encoding) and would be extremely difficult for a user to guess.

Fields AUTHOR-LOGIN, CREATION-DATE-STRING, STATUS-STRING and STATUS-DATE-STRING are indicators relating to the creation and status of a dictation, namely the user who dictated, when the user dictated, an indication of the status of a job to generate a transcription of the dictation and when the status was last updated, respectively.

Figure 7:
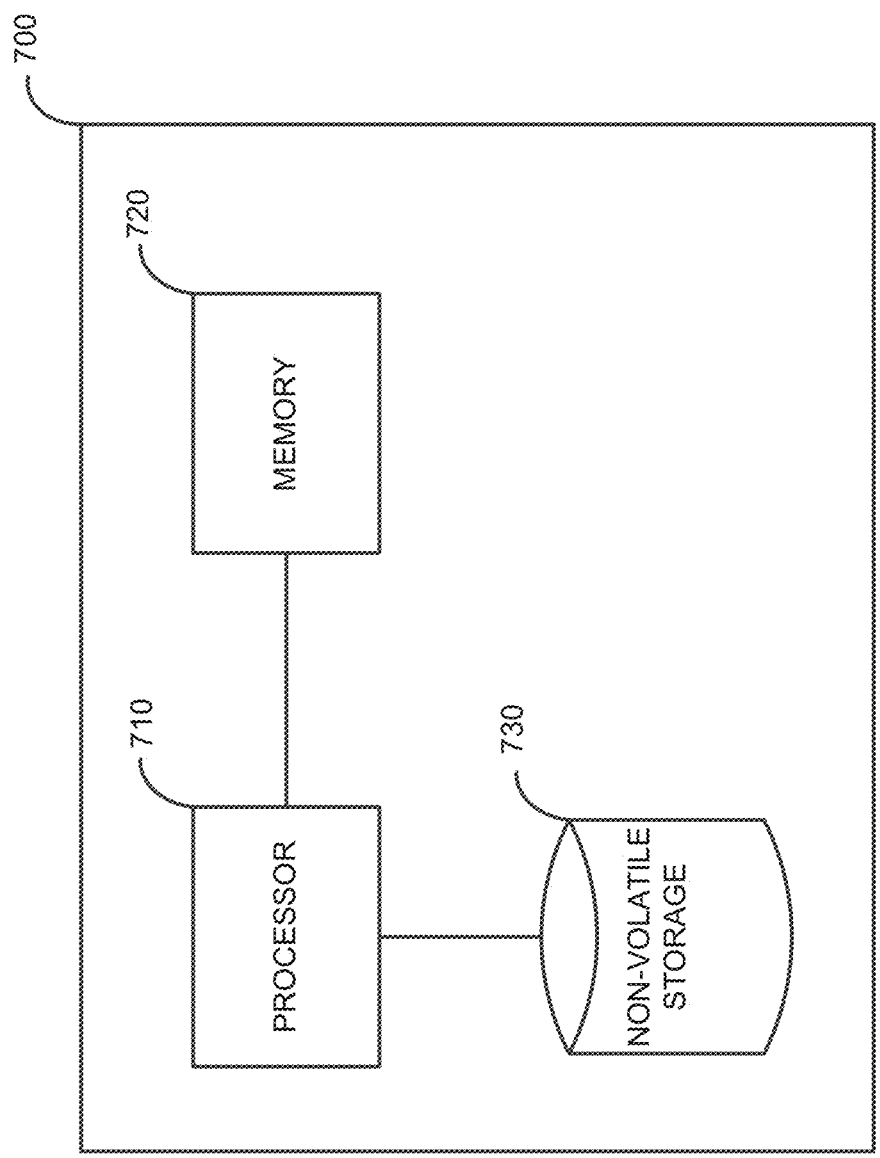
FIG. 7 is a schematic view of a computer system on which techniques described herein may be implemented.

An illustrative implementation of a computer system 700 that may be used to implement one or more of the techniques for delivering transcriptions from a dictation system to an electronic records system is shown in FIG. 7. The computer system 700 may include one or more processors 710 and one or more non-transitory computer-readable storage media (e.g., memory 720 and one or more non-volatile storage media 730). The processor 710 may control writing data to and reading data from the memory 720 and the non-volatile storage device 730 in any suitable manner, as the aspects of the invention described herein are not limited in this respect. To perform functionality and/or techniques described herein, the processor 710 may execute one or more instructions stored in one or more computer-readable storage media (e.g., the memory 720, storage media, etc.), which may serve as non-transitory computer-readable storage media storing instructions for execution by the processor 710.

In connection with techniques for delivering transcriptions described herein, code used to, for example, receive speech input, generate job identifiers, and/or to perform operations on an electronic record may be stored on one or more computer-readable storage media of computer system 700. Processor 710 may execute any such code to provide any techniques for delivery of transcribed dictated speech described herein. Any other software, programs or instructions described herein may also be stored and executed by computer system 700. It will be appreciated that computer code may be applied to any aspects of methods and techniques described herein. For example, computer code may be applied to interact with an operating system to write data to an electronic record.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of associating dictation with an electronic record in a system having a dictation system comprising a dictation application for capture of speech input and a separate electronic records system for managing electronic records, the method comprising:
   receiving, by the dictation application, speech input from a user corresponding to dictation to be associated with an electronic record of the electronic records system;
   obtaining, by the dictation application, a dictation marker, the dictation marker comprising:
   a job identifier associated with the dictation; and
   one or more delimiters, the one or more delimiters identifying a start of the dictation marker and an end of the dictation marker; and
   causing the dictation marker to be inserted into the electronic record.

2. The method of claim 1, wherein the dictation application and an electronic records application configured to access electronic records managed by the electronic records system both operate, at least in part, via an operating system on a user device, and wherein causing the dictation marker to be inserted into the electronic record comprises providing, by the dictation application, the dictation marker to the operating system to be inserted into the electronic record via the electronic records application.

3. The method of claim 1, wherein the dictation marker is inserted into the electronic record indirectly to facilitate associating a transcription of the speech input with the electronic record without requiring integration of the electronic records system with the dictation system.

4. The method of claim 2, wherein the dictation marker is inserted into the electronic record via an edit control of the electronic records application.

5. The method of claim 1, wherein the job identifier is generated by at least one component of the dictation system to uniquely identify the dictation.

6. The method of claim 1, wherein the dictation marker is generated, at least in part, by the dictation application.

7. The method of claim 1, wherein the dictation marker comprises a hyperlink allowing access to information associated with the dictation.

8. The method of claim 1, further comprising causing a transcription of the dictation to be inserted into the electronic record.

9. The method of claim 1, further comprising causing the electronic record to be updated with further information associated with the dictation.

10. The method of claim 1, further comprising obtaining a transcription of the dictation and identifying the electronic record associated with the transcription via the dictation marker in the electronic record.

11. A system for capturing dictation for an electronic records system and associating the dictation with an electronic record managed by the electronic records system, comprising:
   an input configured to receive speech input from a user corresponding to the dictation to be associated with the electronic record; and
   at least one processor configured to:
   obtain a dictation marker comprising:
   a job identifier associated with the dictation; and
   one or more delimiters, the one or more delimiters identifying a start of the dictation marker and an end of the dictation marker; and
   cause the dictation marker to be inserted into the electronic record.

12. The system of claim 11, wherein the at least one processor is configured to generate, at least in part, the dictation marker in response to a user's indication of an intent to dictate content for the electronic record.

13. The system of claim 11, wherein the at least one processor is configured to obtain a transcription of the dictation and replace, at least in part, the dictation marker in the electronic record with the transcription.

14. The system of claim 13, wherein the at least one processor is configured to identify the electronic record into which the transcription is to be inserted by identifying the one or more delimiters of the dictation marker and matching the transcription to the job identifier of the identified dictation marker.

15. The system of claim 11, wherein the electronic records system comprises an electronics records application configured to allow a user to access electronic records managed by the electronics records system, the electronic records application configured to operate, at least in part, via an operating system on a user device, and wherein the electronic dictation marker and/or the transcription of the dictation is inserted into the electronic record indirectly via the operating system.

16. The system of claim 11, wherein the at least one processor is configured to obtain update information associated with the dictation and cause the update information to be inserted into the electronic record, the update information comprising one or more of a draft transcription obtained using automatic speech recognition, and a status associated with the dictation.

17. At least one non-transitory computer readable storage medium storing instructions that, when executed by at least one processor, perform a method of associating dictation with an electronic record in a system having a dictation system comprising a dictation application for capture of speech input and a separate electronic records system for managing electronic records, the method comprising:
   receiving, by the dictation application, speech input from a user corresponding to a dictation to be associated with an electronic record of the electronic records system;
   obtaining, by the dictation application, a dictation marker, the dictation marker comprising:
   a job identifier associated with the dictation; and
   one or more delimiters, the one or more delimiters identifying a start of the dictation marker and an end of the dictation marker; and
   causing the dictation marker to be inserted into the electronic record.

18. The at least one non-transitory computer readable storage medium of claim 17, wherein the method further comprises:
   receiving a transcription of the dictation;
   identifying the corresponding electronic record via the dictation marker in the electronic record; and
   causing the transcription to be inserted into the electronic record.

19. The at least one non-transitory computer readable storage medium of claim 18, wherein causing the dictation marker to be inserted into the electronic record and causing the transcription to be inserted into the electronic record is achieved without integrating the electronics records system with the dictation system.

20. The at least one non-transitory computer readable storage medium of claim 18, wherein the electronic records system comprises an electronic records application configured to operate on a user device to allow access to the electronic records managed by the electronic records system, and wherein the dictation marker and the transcription is inserted into the electronic record via an edit control of the electronic records application.

\* \* \* \* \*